(No Model.)
O. DRAHOS.
BED PAN.
No. 412,734.    Patented Oct. 15, 1889.
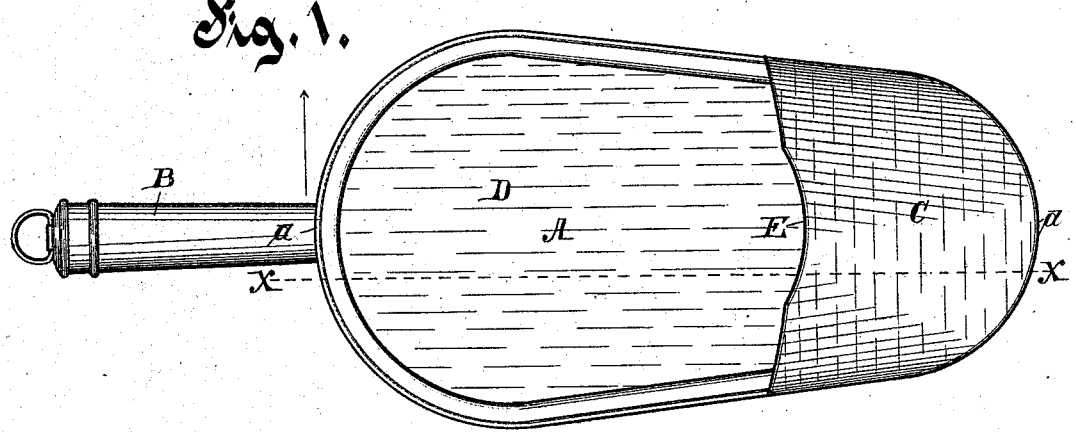
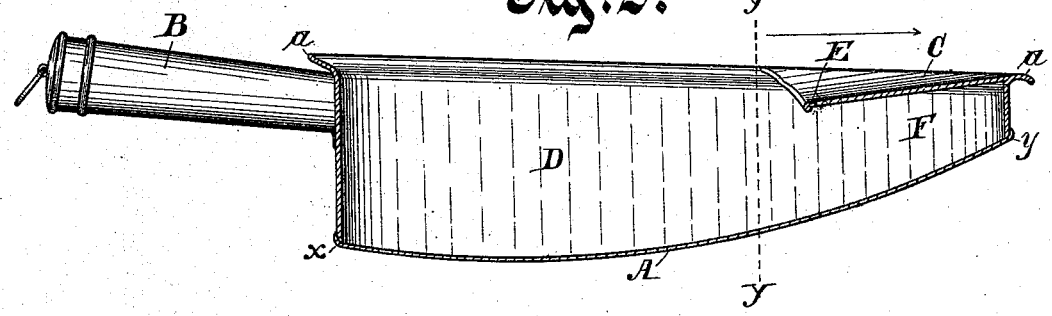
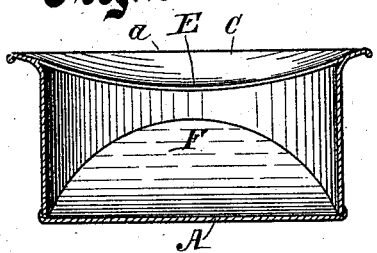
Witnesses.
C. H. Keener
Anna Faust
Inventor.
Otilie Drahos
By Ensign & Benedict
Attorneys.

UNITED STATES PATENT OFFICE.

OTILIE DRAHOS, OF MILWAUKEE, WISCONSIN.

BED-PAN.

SPECIFICATION forming part of Letters Patent No. 412,734, dated October 15, 1889.

Application filed May 20, 1889. Serial No. 311,431. (No model.)

*To all whom it may concern:*

Be it known that I, OTILIE DRAHOS, of Milwaukee, in the county of Milwaukee and State of Wisconsin, have invented new and useful Improvements in Bed-Pans; and I do hereby declare the following to be a full, clear, and exact description of said invention, reference being had to the accompanying drawings, and to the letters or figures of reference marked thereon, which form a part of this specification.

My invention relates to improvements in bed-pans, and its construction is explained by reference to the accompanying drawings, in which—

Figure 1 represents a top view thereof. Fig. 2 is a longitudinal vertical section drawn on line X X of Fig. 1, and Fig. 3 is a vertical cross-section drawn on line Y Y of Fig. 2.

Like parts are referred to by the same reference-letters throughout the several views.

In pans or receptacles of this character as heretofore constructed the bottom of the receptacle A, between the points $x$ and $y$, is made flat in a straight horizontal line, while by my improvement the bottom of the receptacle curves upwardly from the rear end at $x$ to the front end $y$, whereby by pressing downward upon the handle B the receptacle will rock over its curved bottom A and its front end at $y$ will be inclined or thrown upward, so that the upper surface between the points $a$ $a$, which is formed horizontal in a straight line, is inclined upward from the handle toward the front end, whereby any fluid deposited upon the upper surface or plate C will flow rearward into the chamber D of the receptacle. The upper surface or wall C is made concave, curving downwardly and rearwardly to the point E, (more clearly shown in Fig. 3,) whereby any fluid deposited upon said surface C is thereby conducted into the receptacle D, when said receptacle is in a level position.

By inclosing the upper part of the front end of the receptacle by the wall or plate C a chamber F is formed at the extreme front end of the pan, which is capable of receiving and retaining a large portion of the contents of the receptacle at its front end, while said receptacle may be carried, when suspended from the handle in a vertical position, without danger of the contents of the pan escaping therefrom.

In bed-pans as heretofore constructed it has been common to inclose the rear part of the receptacle from the handle forward to or near the center of the receptacle, whereby it becomes impossible to use such form of pan when operating with a syringe or other surgical instrument, while by my improvement the rear part of the pan is entirely open and the front part instead is inclosed, and the pan as thus constructed is much more convenient for use.

Having thus described my invention, what I claim as new, and desire to secure by Letters Patent, is—

1. The pan or receptacle herein described, having a vertical rear wall and bottom A, horizontal in cross-section and curved longitudinally and upwardly from the lower end of the vertical rear wall at the point $x$ to the point $y$, vertical side walls having horizontal upper edges between the points $a$ $a$, a concave tight cover or plate C at its front end, formed integral therewith, inclining rearwardly and downwardly from the front end toward the center of the receptacle, the rear end of said receptacle being open at its top, all substantially as and for the purpose specified.

2. As a new article of manufacture, the receptacle herein described, consisting of the chamber D, the bottom A of which is horizontal in cross-section and curved longitudinally forwardly and upwardly from its vertical rear wall to its front end and having open rear end, its front end being provided with an inclosing concave plate C, converging downwardly and inwardly toward the center of the receptacle, and its rear end provided with a handle B, affixed thereto, all substantially as and for the purpose specified.

In testimony whereof I affix my signature in presence of two witnesses.

OTILIE DRAHOS.

Witnesses:
  FRANK DRAHOS,
  ROSA KADERABEK.